(12) United States Patent
Rea et al.

(10) Patent No.: US 9,470,315 B2
(45) Date of Patent: Oct. 18, 2016

(54) MODULAR SEAL SUPPORT SYSTEM

(75) Inventors: Christopher John Rea, Rotherham (GB); Stephen Martin Shaw, Sheffield (GB); Andrew Colverson, Doncaster (GB); Alan James Roddis, Sheffield (GB)

(73) Assignee: AES Engineering Ltd., Rotherham (GB)

( * ) Notice: Subject to any disclaimer, the term of this patent is extended or adjusted under 35 U.S.C. 154(b) by 1045 days.

(21) Appl. No.: 13/318,265

(22) PCT Filed: Apr. 29, 2010

(86) PCT No.: PCT/GB2010/000863
§ 371 (c)(1),
(2), (4) Date: Apr. 18, 2012

(87) PCT Pub. No.: WO2010/125353
PCT Pub. Date: Nov. 4, 2010

(65) Prior Publication Data
US 2012/0235358 A1    Sep. 20, 2012

(30) Foreign Application Priority Data

Apr. 29, 2009   (GB) .................................. 0907285.1

(51) Int. Cl.
*F16J 15/34* (2006.01)
*F16J 15/40* (2006.01)

(52) U.S. Cl.
CPC ............. *F16J 15/3404* (2013.01); *F16J 15/40* (2013.01); *Y10T 29/49826* (2015.01)

(58) Field of Classification Search
CPC . Y10T 29/49826; F16J 15/3404; F16J 15/40
USPC ...... 248/125.8, 125.9, 122.1, 127, 158, 157, 248/176.1, 176.3, 205.1; 454/237
See application file for complete search history.

(56) References Cited

U.S. PATENT DOCUMENTS

| | | | |
|---|---|---|---|
| 6,612,533 B2 * | 9/2003 | Biles et al. | 248/354.1 |
| 7,802,768 B2 * | 9/2010 | Carnevali | 248/412 |
| 2004/0194853 A1 | 10/2004 | Cuffari, Jr. et al. | |
| 2006/0213574 A1 | 9/2006 | McKeever et al. | |
| 2009/0984739 | 4/2009 | Shock et al. | |
| 2010/0123055 A1 | 5/2010 | Roddis | |
| 2011/0009809 A1 * | 1/2011 | Bielfeldt et al. | 604/23 |

FOREIGN PATENT DOCUMENTS

| | | |
|---|---|---|
| GB | 861705 A | 2/1961 |
| GB | 2007348 A | 5/1979 |

* cited by examiner

*Primary Examiner* — Gilbert Lee
(74) *Attorney, Agent, or Firm* — Edwin D. Schindler

(57) ABSTRACT

A seal support system, or a kit therefor, for use with a sealing device to seal a piece of industrial equipment, includes a stand with fixed support elements for accommodating selected functional components with different sizes of components being accommodated by differently sized pipework elements. The stand has one or more substantially fixed brackets with each bracket having a component securing device at predetermined longitudinal space intervals.

9 Claims, 6 Drawing Sheets

MODULAR SEAL SUPPORT SYSTEM

FIELD OF THE INVENTION

This invention relates to seal support systems and especially systems, which are used with mechanical seals for the containment of process fluid.

BACKGROUND TO THE INVENTION

A seal support system typically comprises of a vessel or tank, which generally contains a volume of fluid. The vessel is piped to a sealing device on a pump, mixer or item of rotating equipment. Generally a return pipe is lead back to the vessel from the sealing device, hence closing the "loop". This allows the fluid, contained in the vessel, to enter and exit the sealing device. Typically such a seal support system is employed with a mechanical seal with two or more sets of seal faces, more commonly referred to as a double or dual seal.

The fluid within the vessel is generally chosen so that it lubricates and cools the components within the sealing device, whilst being compatible with the process fluid. The industry term for the fluid contained within the vessel, is Barrier or Buffer fluid.

It is not uncommon for the seal support system to have other items of equipment, sited around the vessel, to permit pressure being applied to the barrier/buffer fluid, or to allow additional cooling or fluid circulation around the seal.

Generally the sealing device sited on the item of rotating equipment is a mechanical seal comprising of a rotating member, which is secured to a shaft, and a stationary member which is secured to a housing.

The interface, between the rotating member and the stationary member, on the mechanical seal, prevents the processed product from escaping.

It is a well-documented fact that the majority of mechanical seals have a fluid film, acting between the two sliding seal faces. This fluid film lubricates the set of seal faces. The wider the fluid film, the more the mechanical seal can be said to leak. Therefore over time, some fluid loss from the vessel is to be expected. A means to maintain pressure and fluid level within the vessel is therefore desirable.

Further loss of fluid from the vessel may result due to evaporation. Therefore a means to reduce said evaporation losses is also desirable.

The reader will therefore note that seal support systems can complex in nature, involving many hundreds of parts all with a specific purpose and duty.

In addition certain industries, such as the Oil and Gas industry, have complex standards which outline the design of some of the parts.

Lastly, many customers have their own in-house specifications for seal support systems, not only outlining the types of components but the style of fixing the components such as socket welding, fillet welding and threaded flanges.

It is therefore deemed advantageous if a modular seal support system can be offered which accommodates multiple component configurations from one design as this will enable the supplier of said systems to easily expedite bespoke configurations to suit many industrial applications.

STATEMENTS OF THE INVENTION

According to the present invention there is provided a modular seal support system for use with a sealing device employed to seal a piece of industrial equipment. Said seal support system is characterised by A stand, used to position and site multiple components A fluid connection means from the system to the seal and from the seal to the system wherein, said stand has one or more substantially fixed elements, herewith termed brackets and each bracket has component securing means at predetermined longitudinal space intervals. Said space intervals are determined such that any number of different components can be secured onto said brackets to accommodate the differing application requirements.

Preferably, the brackets are welded to the vertical member of the stand.

Preferably, the securing means at predetermined longitudinal space intervals accommodates butt welded flanges and fillet and/or socket welded flanges.

The present invention may also be considered as a seal support kit for assembling a system for providing barrier fluid to a device for sealing a piece of industrial equipment, the kit comprising a stand with first and second fixed support element thereon, a plurality of differently sized vessels for storing barrier fluid, said first fixed support element being for supporting a chosen vessel, a plurality of differently sized functional components of a first type and a plurality of differently sized functional components of a second type, and differently sized pipework elements which may be selected for mounting on the stand by means of the second support elements and so as to interconnect the chosen functional components and the vessel.

For example, functional components may include a pressure gauge, an isolation valve and a ball valve.

There are various benefits of the modular seal support system of the invention, not least the ability to simplify the configuration of a number of complex component arrangements, which will now herewith be described with the aid of the following drawings.

DETAILED DESCRIPTION OF THE INVENTION

The invention will now be described, by way of examples only, with reference to the accompanying drawings.

Figure 1:
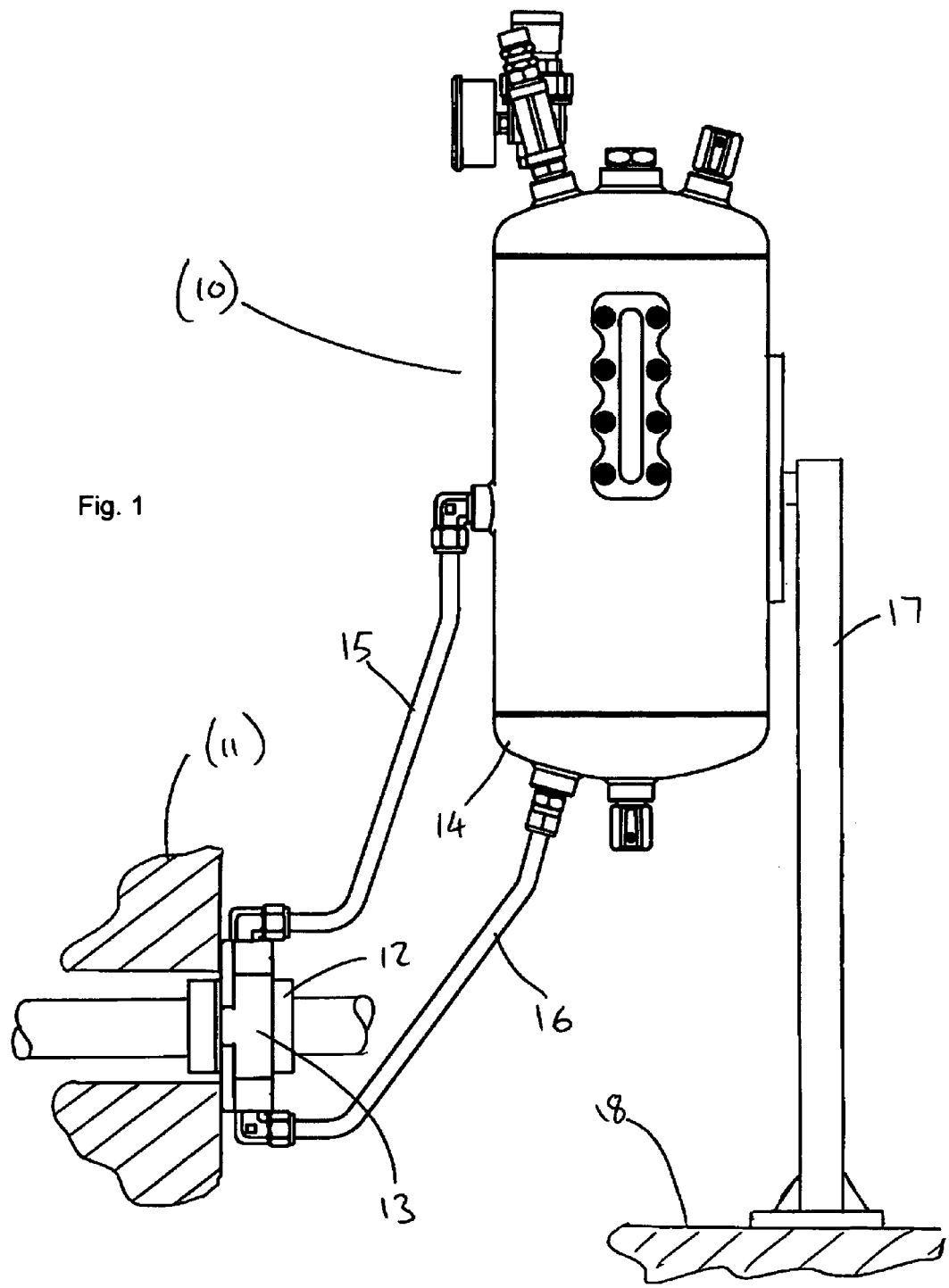
FIG. 1 is a front view of a prior art seal support system connected to a mechanical seal

FIG. 1 is a schematic view of a prior art seal support system 10. From FIG. 1, an item of industrial equipment such as a pump 11 is sealed with a sealing device such as a double mechanical seal 12.

Within the mechanical seal 12 is a fluid, termed barrier fluid 13, used to keep the seal faces cool and lubricated. The seal 12 has an integral pumping ring (not shown) used to circulate the barrier fluid 13 from the seal 12 to vessel 14 by way of connecting pipe 15 and from the vessel back to the seal 12 by way of connecting pipe 16.

The vessel 14 is mounted onto a stand 17 which is preferably secured to the ground 18.

FIG. 1 thereby shows a simple seal support system and its relation to the mechanical seal and item of rotating equipment. This relation will therefore not be referred to again as it is widely known.

Figure 2:
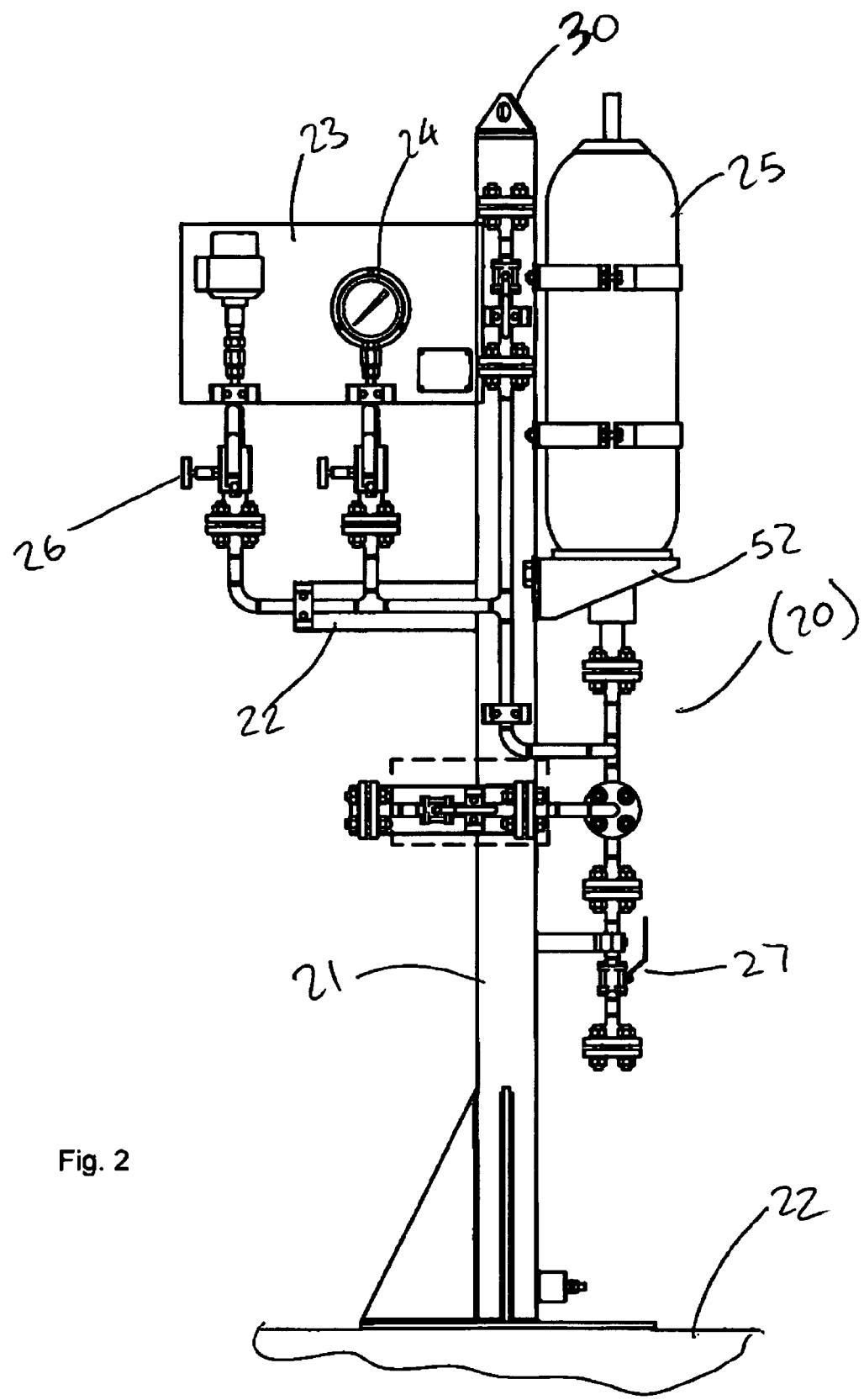
FIG. 2 is a front view of a modular complex seal support system of the invention FIG. 3 corresponds to FIG. 2 and shows an isometric view of the modular complex seal support system of the invention FIG. 4 corresponds to FIG. 2 and shows two different types of components accommodated in the same longitudinal space arrangement.

FIG. 2 is a front view of a modular complex seal support system 20 of the invention.

From FIG. 2, the modular system 20 comprises of a substantially vertical stand member 21 which is preferably secured to the ground 22.

Preferably, at periodic longitudinally spaced intervals, are one or more brackets 22 and/or plates 23 secured to said vertical stand member 21. Said brackets 22 and plates 23 are designed to site one or more complex components as deemed appropriate by the application. By way of example only, said components could include a pressure gauge 24, a vessel or accumulator 25, an isolation valve 26, and a ball valve 27.

Figure 4:
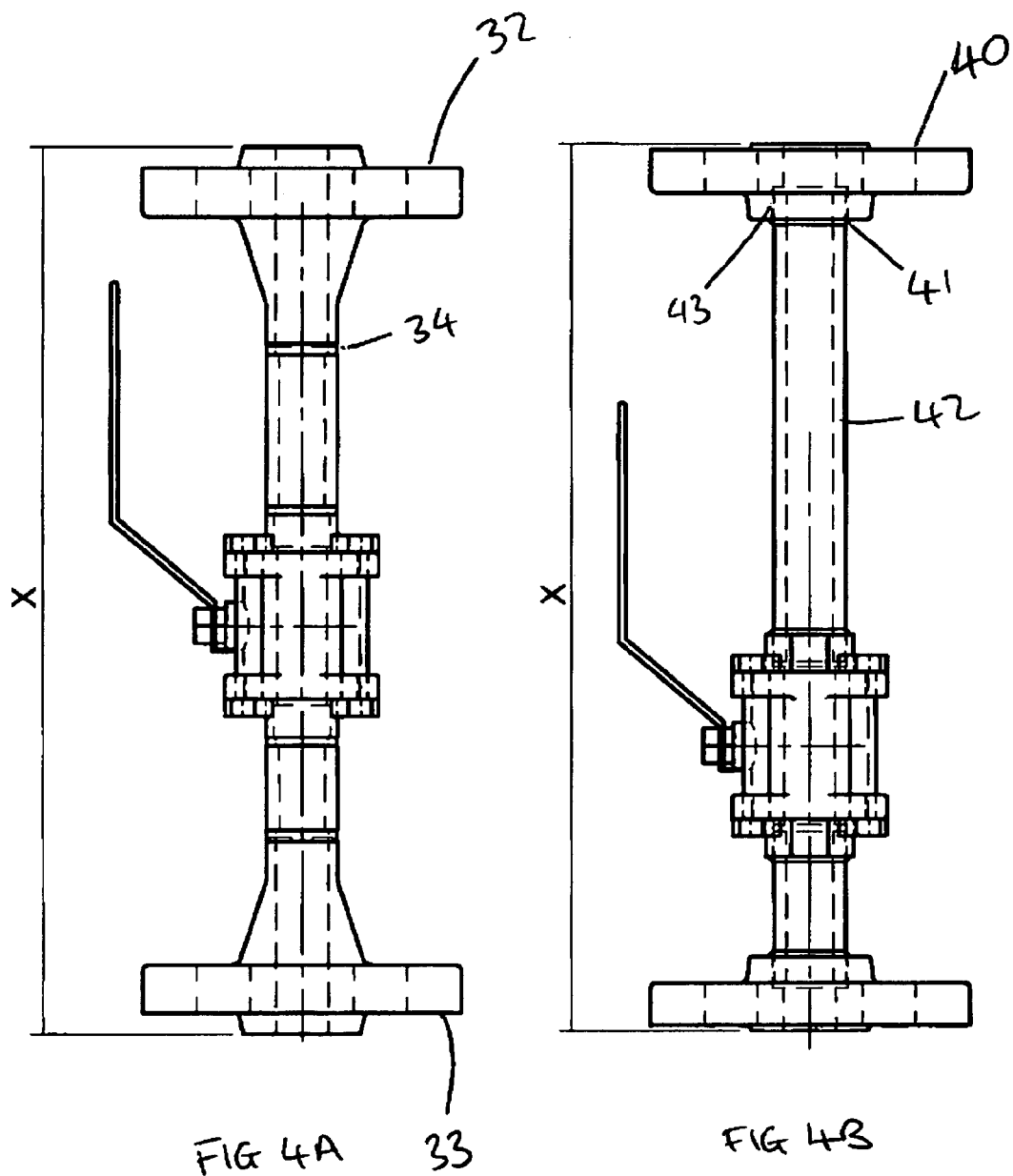

Said brackets 22 and/or plates 23 are preferably spaced to accommodate a wide range of intermediate components and component securing and/or connecting means as will be further described and illustrated by FIG. 4.

Preferably, said modular complex seal support system 20 has an integral lifting means 30, so that the system can be sited and manoeuvred easily. Preferably, said lifting means 30 is positioned at the upper most position within the system 20. Preferably, said lifting means 30 seals the inner most surfaces of vertical stand 21, preventing internal corrosion from moisture entry.

Figure 3:
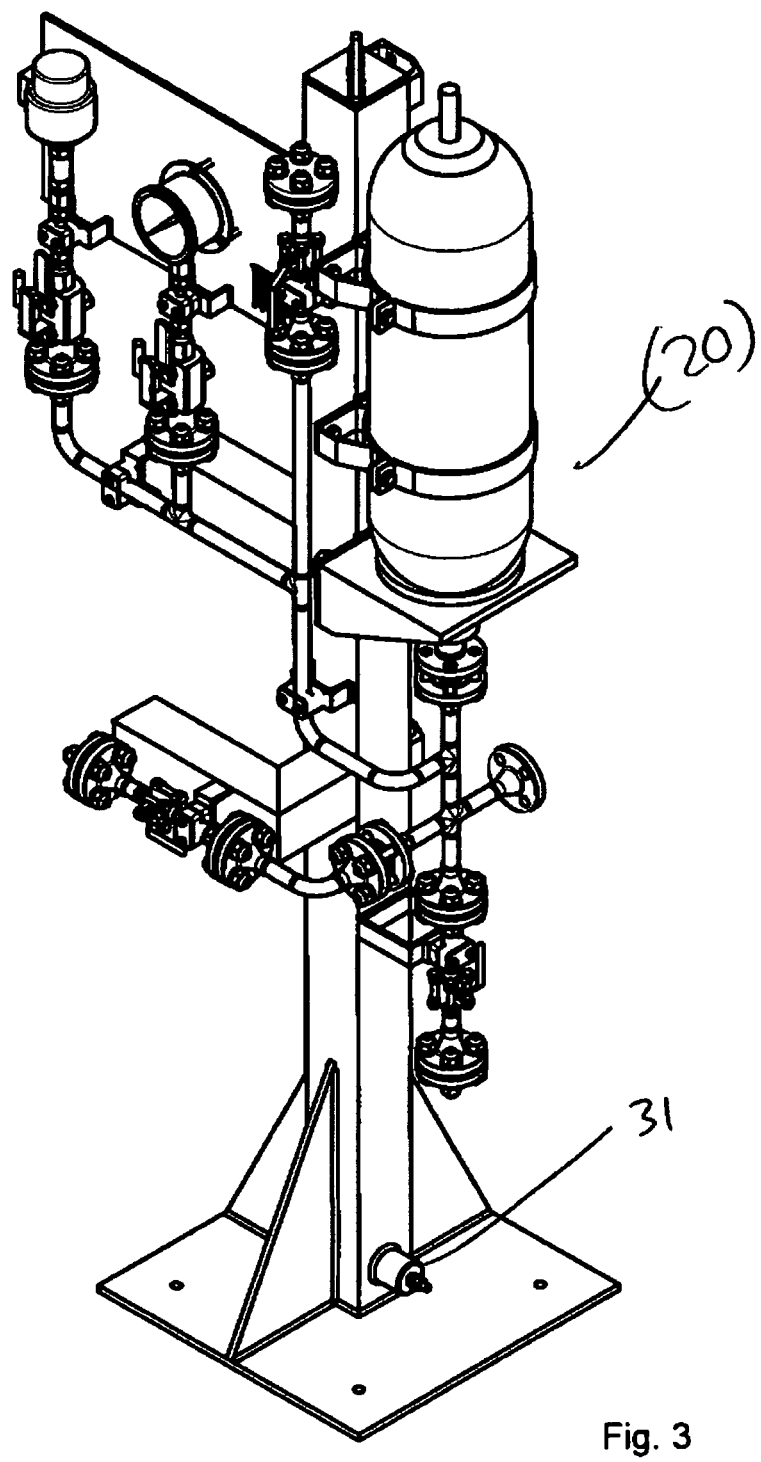

FIG. 3 corresponds to FIG. 2 and shows an isometric view of the modular complex seal support system 20 of the invention, more clearly showing the complex relationship between the number of components.

Preferably, as shown, said stand 21 has an integral grounding or earthing means 31.

FIG. 4 corresponds to FIG. 2 and by way of example is an enlarged view of the ball valve 27 and more specifically, the connecting means between the respective flanges 32 and 33.

FIG. 4A and FIG. 4B shows a common longitudinal distance "X" between said flanges, however the reader will note two different types of flanged components employed between said Figures.

FIG. 4A thereby shows a butt welded mounting flange 32 whereby the join 35 between the flange 32 and the connecting pipe 35 is an in-line joint, typically termed butt. The two parts 32 and 35 are preferably permanently secured together by a weld around the circumference of the joint. This is a pressure tight joint due to the nature of the sealing system application.

FIG. 4B thereby shows a socket welded mounting flange 40 whereby the join 41 between the flange 40 and the connecting pipe 42 is a 90 degree type joint, typically termed fillet. Again, the two parts 40 and 42 are preferably permanently secured together by a weld around the circumference of the joint. The socket term is used as the pipe 42 is preferably inserted into a hole 43 in the flange 40 before the joint is secured. Again, this is a pressure tight joint due to the nature of the sealing system application.

The reader will note that some industrial plants specify butt welded joints whereas some industrial plants specify socket welded joints. The modular system 20 of the invention permits a multitude of joining and component siting means from one modular stand 21. This embodiment is deemed specifically advantageous.

Figure 5:
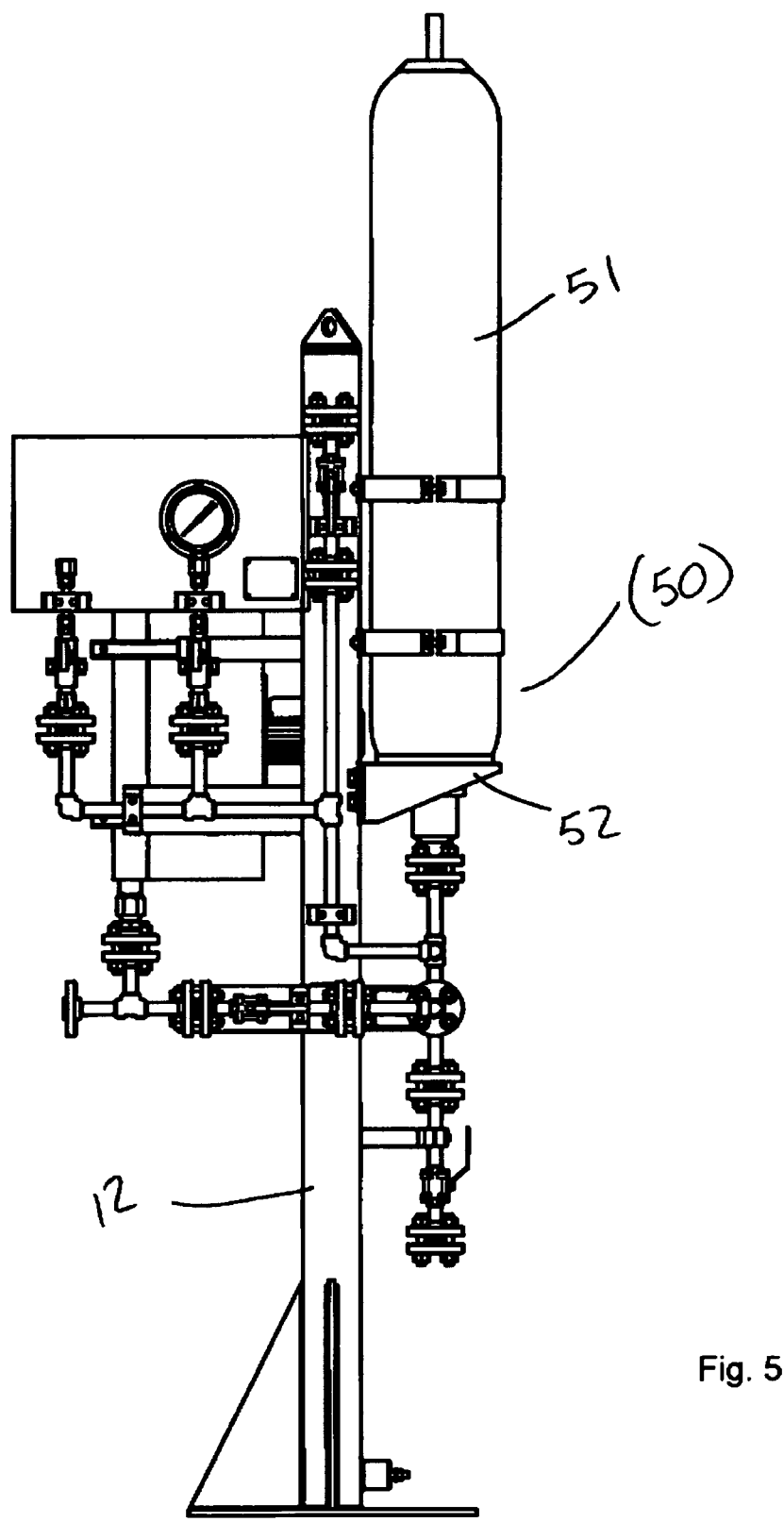
FIG. 5 shows a front view of a further modular complex seal support system of the invention.

FIG. 5 shows a front view of a further modular complex seal support system 50 of the invention, whereby a different size vessel and/or accumulator 51 is accommodated by the modular stand 12 and mounting bracket 52.

Figure 6:
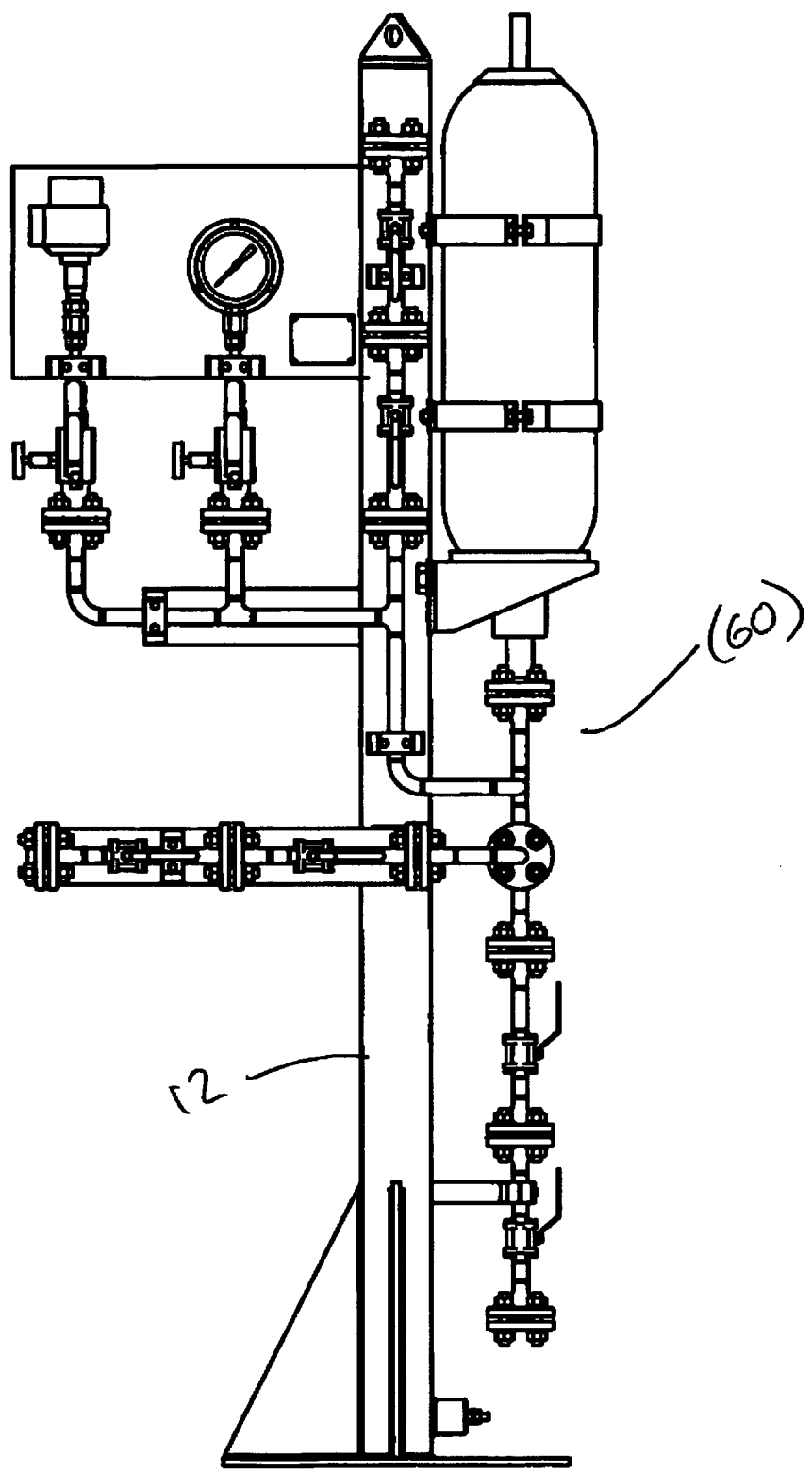
FIG. 6 shows a front view of a further modular complex seal support system of the invention.

FIG. 6 shows a front view of a further modular complex seal support system 60 of the invention, by way of example to further show the multiple configurations that may be accommodated by a modular stand 12.

The embodiments of the design are not restricted to complex seal support systems, as clearly they can be applied to other types of industrial equipment such as coolers, as deemed advantageous.

The invention claimed is:

1. A seal support system for use with a sealing device for sealing a piece of industrial equipment, comprising:
   a seal for sealing a piece of industrial equipment;
   a barrier fluid contained with the seal support system;
   a vessel for receiving said barrier fluid;
   means for connecting said seal with said vessel for circulating said barrier fluid;
   means for connecting said vessel with said seal for circulating said barrier fluid;
   a stand for supporting said vessel having at least one fixed bracket with each said fixed bracket having means for securing a component of fixed length at predetermined longitudinally spaced intervals; and,
   rigid pipework for connecting said component with at least one of said vessel and an additional component, so that said component is in fluid communication with at least one of said vessel and said additional component, said rigid pipework being able to be secured together via welding.

2. The seal support system for use with a sealing device for sealing a piece of industrial equipment according to claim 1, wherein each said fixed bracket is secured to a vertical member of said stand.

3. The seal support system for use with a sealing device for sealing a piece of industrial equipment according to claim 1, wherein each said fixed bracket is able to have secured thereto a component and the predetermined longitudinally spaced intervals between each said fixed bracket accommodates multiple types of components.

4. A seal support kit for assembling a system for providing a barrier fluid to a device for sealing a piece of industrial equipment, said seal support kit comprising:
   a stand having a first fixed support element and a second fixed support element thereon;
   a plurality of differently sized vessels for storing the barrier fluid, said first fixed support element being for supporting a selected vessel;
   a plurality of differently sized functional components; and,
   differently sized rigid pipework elements mountable on said stand via said second fixed support element for interconnecting selected said functional components and the selected vessel, said differently sized rigid pipework being able to be secured together via welding.

5. A method for assembling a seal support system having a plurality of seal support components with at least one seal support component of said plurality of seal support components being available in a plurality of embodiments, each said embodiment in an assembled said seal support system occupying an equal length as measured between adjacent said seal support components, said method for assembly said seal support system comprising the steps of:
provided a seal support stand having a stand body and at least one bracket fixed relative to said stand body;
selecting said seal support component including selecting a said embodiment of said plurality of embodiments; and,
connecting together via rigid pipework elements and securing on said stand using said brackets said seal support components for forming said seal support system, said rigid pipework elements being able to be connected together and secured via welding.

6. The method for assembling a seal support system according to claim 5, wherein said brackets are welded to said stand body.

7. The method for assembling a seal support system according to claim 5, wherein said embodiment is connectable to an adjacent said seal support component by at least one butt-welded joint or at least one socket-welded joint.

8. The seal support system for use with a sealing device for sealing a piece of industrial equipment according to claim 1, further comprising a valve between said vessel and said seal for controlling a flow of the barrier fluid thereto.

9. The seal support system for use with a sealing device for sealing a piece of industrial equipment according to claim 1, further comprising means for lifting said the seal support system at a top portion of said stand for situating and maneuvering the seal support system.

\* \* \* \* \*